United States Patent
Becker et al.

(10) Patent No.: US 6,879,055 B2
(45) Date of Patent: Apr. 12, 2005

(54) BASE FRAME FOR MOUNTING THE SHAFT OF THE ROTOR OF A WIND POWER PLANT ONTO THE PLANT TOWER

(75) Inventors: Markus Becker, Rheine (DE); Roland Weitkamp, Belm-Icker (DE); Vincent Schellings, Enschede (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/126,299

(22) Filed: Apr. 19, 2002

(65) Prior Publication Data

US 2003/0080566 A1 May 1, 2003

(30) Foreign Application Priority Data

Apr. 20, 2001 (DE) .......................... 101 19 428

(51) Int. Cl.[7] .............. F03D 9/00; F03D 1/06; F03D 11/00; F03D 11/04; F03D 7/02
(52) U.S. Cl. ............... 290/55; 290/44; 290/54
(58) Field of Search ............... 290/44, 54–55

(56) References Cited

U.S. PATENT DOCUMENTS

| | | | | |
|---|---|---|---|---|
| 2,153,523 A | * | 4/1939 | Roberts et al. ............... | 290/55 |
| 2,278,247 A | * | 3/1942 | Culling ....................... | 290/55 |
| 2,655,604 A | * | 10/1953 | Hutter ......................... | 290/55 |
| 4,006,925 A | * | 2/1977 | Scherer ....................... | 290/55 |
| 4,039,848 A | * | 8/1977 | Winderl ....................... | 290/55 |
| 4,068,131 A | * | 1/1978 | Jacobs et al. ................. | 290/55 |
| 4,088,420 A | * | 5/1978 | Jacobs et al. ................. | 416/9 |
| 4,189,648 A | * | 2/1980 | Harner ......................... | 290/44 |
| 4,193,005 A | * | 3/1980 | Kos et al. ..................... | 290/44 |
| 4,266,911 A | * | 5/1981 | Helm et al. .................... | 416/9 |
| 4,297,075 A | * | 10/1981 | Jacobs et al. ................. | 416/14 |
| 4,495,423 A | * | 1/1985 | Rogers ......................... | 290/44 |
| 4,527,072 A | * | 7/1985 | van Degeer .................... | 290/55 |
| 4,565,929 A | * | 1/1986 | Baskin et al. ................. | 290/44 |
| 4,585,950 A | * | 4/1986 | Lund ............................ | 290/44 |
| 4,757,211 A | * | 7/1988 | Kristensen .................... | 290/55 |
| 4,871,923 A | * | 10/1989 | Scholz et al. ................. | 290/55 |
| 5,663,600 A | * | 9/1997 | Baek et al. .................... | 290/55 |
| 5,990,568 A | * | 11/1999 | Hildingsson et al. ......... | 290/55 |
| 6,232,673 B1 | * | 5/2001 | Schoo et al. .................. | 290/55 |
| 6,285,090 B1 | * | 9/2001 | Brutsaert et al. ............. | 290/55 |
| 6,428,274 B1 | * | 8/2002 | Hehenberger ............... | 416/153 |
| 6,459,165 B1 | * | 10/2002 | Schoo ......................... | 290/1 C |
| 6,465,901 B2 | * | 10/2002 | Croes .......................... | 290/55 |
| 6,483,199 B2 | * | 11/2002 | Umemoto et al. ............ | 290/55 |
| 6,504,260 B1 | * | 1/2003 | Debleser ...................... | 290/44 |
| 6,750,559 B2 | * | 6/2004 | Becker ......................... | 290/55 |

FOREIGN PATENT DOCUMENTS

| | | | |
|---|---|---|---|
| DE | 41 04 454 C1 | 7/1992 | |
| DE | 198 14 629 A1 | 9/1999 | |
| EP | 954613 A2 * | 9/1999 | ............. F03D/7/02 |
| EP | 1101934 A2 * | 5/2001 | ............. F03D/1/06 |
| WO | WO 8204466 A * | 12/1982 | ........... F03D/11/04 |
| WO | WO 2097265 A1 * | 12/2002 | ............. F03D/9/00 |
| WO | WO 3014562 A1 * | 2/2003 | ............. F03D/1/04 |

* cited by examiner

*Primary Examiner*—Nicholas Ponomarenko
*Assistant Examiner*—Pedro Cuevas
(74) *Attorney, Agent, or Firm*—Blakely, Sokoloff, Taylor & Zafman LLP

(57) ABSTRACT

To facilitate transport and assembly during the erecting of wind power plants, a two-part base frame is proposed for the azimuthal adjustment of the gondola on the tower of the wind power plant, the lower part of which 16 has the azimuthal drive device 23 and the upper part 6 of which has the drive train 1, 2, 12, 13, 14. Both parts are pre-assembled at the factory, set onto the tower, and screwed tight onto each other at their connection point 15.

18 Claims, 3 Drawing Sheets

Figure 1:
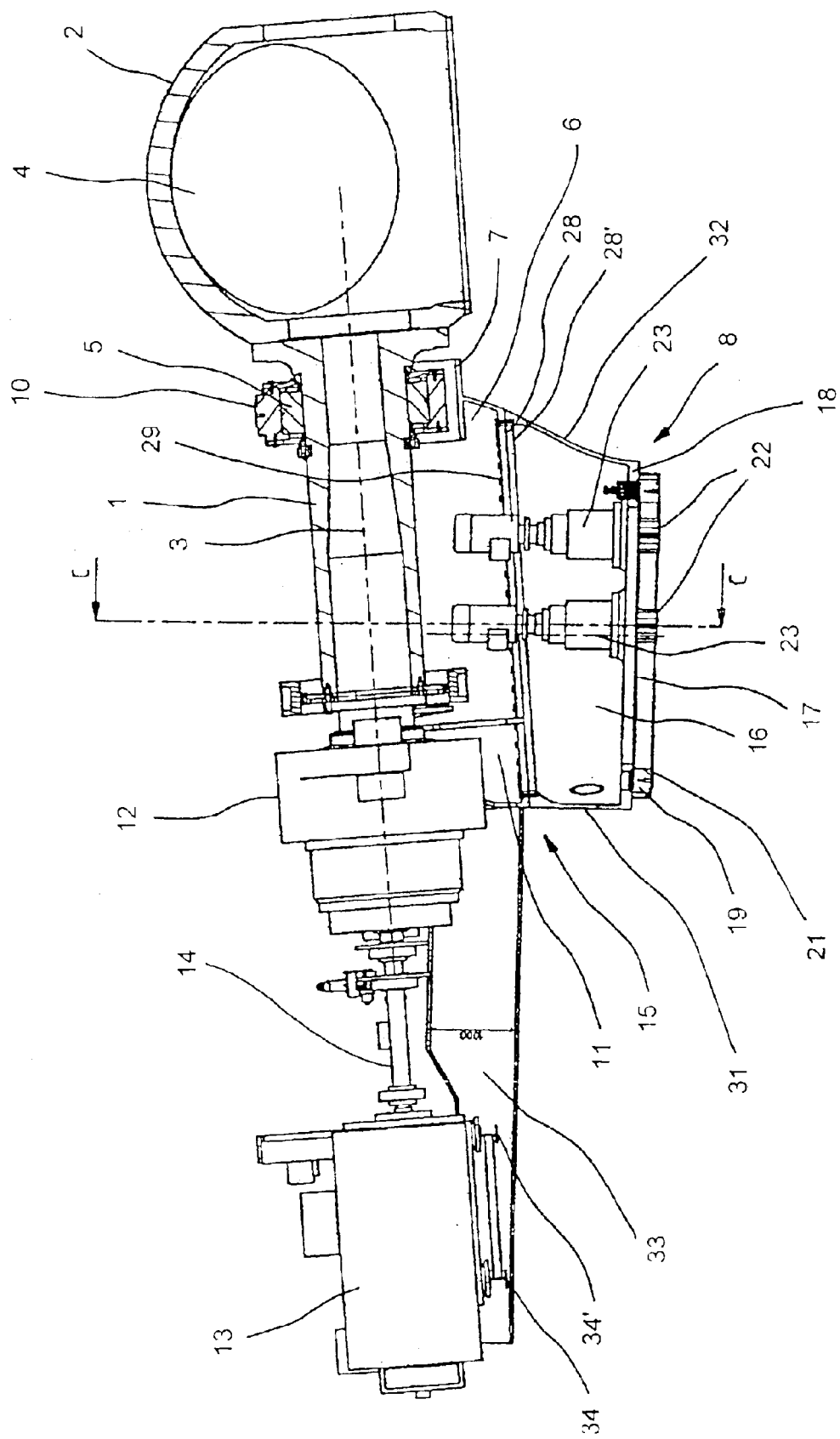

BASE FRAME FOR MOUNTING THE SHAFT OF THE ROTOR OF A WIND POWER PLANT ONTO THE PLANT TOWER

The invention involves a base frame for the arrangement of a drive train on the tower of a wind power plant. The drive train is driven by a wind-driven rotor. The base frame is affixed onto the tower with an essentially horizontal orientation of the rotor axis so that it can rotate azimuthally around the essentially vertical axis of the tower and is constructed from an upper part that carries the drive train and a lower part that has an azimuthal drive device that is combined with the upper part at a connection point and functions for azimuthal rotation.

Known wind power plants, in which the rotor axis is arranged essentially transverse to the tower axis, i.e. essentially horizontally, and can be adjusted azimuthally as a function of the wind direction, usually have, at the upper end of the tower, an azimuthally adjustable machine housing, also called a gondola, in which the drive train is arranged, which has, for example, a rotor shaft, a gear which is connected to the rotor shaft on the input side and through which the relatively low rotational speed of the rotor is converted into a high rotational speed at the output of the gear, and a generator connected to the output of the gear, whereby in the gondola, if necessary, additional mechanical and electrical components required for the operation of the wind power plant can be housed. With increasing power of this wind power plant, the dimensions of this machine housing and the weight of the machine housing and the components housed in it become larger and larger. This presents a considerable problem in the erecting of wind power plants, because it is more and more difficult, with increasing dimensions and weight, to perform the transport to the building site and the assembly.

In regard to these difficulties, the purpose of the invention is to create a base frame of the type named at the beginning, which makes it easier to accomplish transport and assembly work associated with the erecting of the wind power plant, while having sufficient stability.

According to the invention, this purpose is achieved in that the connection point (15) extends along an essentially horizontal cross-section, which has a larger dimension in the direction of the rotor axis (3) than in the direction perpendicular to that.

By the two-part construction of the base frame, a division of the total mass and the total dimensions into two partial systems is achieved, each of which can be transported more easily to the construction site and lifted to the tower. Especially decisive in the process is the limitation of the transport height achieved by the two-part construction. An additional advantage consists in that for a crane capacity that is sufficient at the construction site, a complete preliminary assembly of the upper and lower parts can occur in the manufacturer's factory with the respective components to be housed. For example, the lower part can be assembled preliminarily with the azimuthal drive device and the upper part with the drive train, and if necessary, all additional components can be pre-assembled at the factory. At the construction site, only the lower part needs to be mounted onto the tower and the upper part needs to be mounted onto the lower part, while all other assembly work already anticipated at the factory is not necessary.

The construction of the connection point according to the invention is especially favorable in a structural-mechanical manner with regard to the forces that stress it. The forces acting on the wind-driven rotor are introduced along the rotor axis into the upper part of the base frame. For the stress of the connection point caused by this, it is especially favorable that it has its largest dimension in this direction.

A functional embodiment form is distinguished in that the base frame has a hollow body (8) that is radially limited in relation to the tower axis by an essentially closed wall, whereby the cross-sections of this hollow body have, in its lower end area (17) that borders on the upper end of the tower, a circular contour that, for the cross-sections placed above it axially, making a transition into a contour that is elongated in the direction of the rotor axis (3), and the connection point (15) is arranged in the area of its elongated contours.

The circular-shaped contour of the radial hollow body cross-sections in the lower end area of the lower part function for the adaptation to the azimuthal adjustability in relation to the tower axis. By the smooth upward transition into the elongated cross-section contour, the hollow body adapts its shape to the components to be received by the upper part. Since the main introduction of force is done via the rotor arranged on the upper part in the direction of its rotor axis, an optimal adaptation of the connection point is achieved in a structural-mechanical manner by the arrangement of the connection point in the area of the elongated cross-section contours.

In an especially functional embodiment form it is provided that the connection point of the two parts extends into a plane that extends parallel to the rotor axis and perpendicularly to the tower axis. For the case, that in a known way the rotor axis does not extend exactly perpendicular to the tower axis, i.e. not exactly horizontally, in order to offset wind load-dependent deflections of the rotor blades, but instead rises only slightly up to the hub of the rotor, then the plane separating both parts preferably follows this rise of the rotor axis.

Furthermore, it is functional to construct the base frame in such a manner that each of the two parts have, in the area of the connection point, a flange that is essentially radial in relation to the tower axis and that has end faces facing each other that can be clamped together, whereby in particular both parts can be connected by screwed bolts going through the flange. Thus, it only necessary during the final assembly to set the upper part with its flange onto the flange of the lower part and to clamp together the two flanges in a non-positive manner. In particular, many holes which go through can be arranged in closely following one another along the circumferential flanges, which extend out from the inner wall of the hollow body, for example, and through these holes a correspondingly large number of screwed bolts is passed in order to screw the flanges tightly together during the final assembly.

In regard to the shape of the hollow body, it has proven to be especially functional that the elongated contours in the area of the connection point are constructed so that they are symmetrical to the rotor axis and have, at their end area that faces away from the rotor, a first section that extends crosswise to the rotor axis and is bent at its ends in the direction to the end area that faces the rotor, at its end area that faces the rotor, a second section bent towards the end area that faces away, and two side sections that connect the first section to the second section. This shape is especially favorable in regard to the mechanical rigidity of the hollow body. In the process, the first section is preferably arched slightly to the outside, whereas the two side sections, especially to limit the lateral dimension, run almost straight with a very slight arch to the outside and by this flattened shape contribute to the reduction of the transport width.

For these reasons, it is additionally functional in regard to the shape that the contours of the longitudinal sections of the hollow body parallel to the tower axis and to the rotor axis run essentially parallel to the tower axis in their area that faces away from the rotor and in their area that faces towards the rotor run at a distance from the tower axis which increases from the bottom to the top. This shape has the additional advantage that the area of the hollow body facing the rotor projects outwards from the bottom to the top relative to the tower in the manner of a ship's bow, whereby the rotor that rotates in front of it takes on a corresponding distance from the tower.

In the context of the invention, it is further provided that in the upper part in its area that faces the rotor, a recess for a rotor shaft bearing is constructed. By this, the bearing of the rotor shaft is achieved on the base frame in an especially simple way.

For similar reasons, it is functional that in the upper part in its area that faces away from the rotor, a recess for the support of a gear is constructed. In this way, the arrangement of the gear on the base frame is made easier.

An additional point of the invention consists in that the lower part has, on its lower end an area that borders the upper end of the tower, a flange directed radially to the inside, on which at least one servomotor of the axial drive device is arranged with the drive axis parallel to the tower axis and a pinion gear that is arranged rotationally fixed on the drive axis for combing mesh into an inner crown gear that is affixed on the upper end of the tower coaxially to the tower axis. This attachment of the servomotor to the flange of the lower part makes possible an especially simple design of the axial drive device. If the servomotor is turned on, the pinion gear driven by it combs with the inner crown gear affixed to the tower and causes in this way the azimuthal movement of the base frame. Usually, several of these servomotors, in particular, four servomotors, are provided, which are arranged in pairs symmetrically on both sides of a hypothetical plane positioned through the rotor axis and the tower axis.

In regard to the azimuthal drive device, it is further functional that the inner crown gear is constructed on the inner ring of a roller bearing whose outer ring is affixed to the lower part. In this way, the azimuthal twisting capability between the tower and the base frame as well as the axial attachment of the base frame to the tower is ensured.

An additional development significant for all embodiment forms consists in that on the upper part, two supports that extend away from its end that faces away from the rotor essentially in the direction of the rotor axis are arranged, on which at least one generator of the wind power plant can be supported. These two supports can also function for the support of additional mechanical and electrical components of the wind power plant. Functionally, the combined distance of the two supports measured crosswise to the rotor axis is greater than the crosswise dimensions of the generator and/or the additional components. In this case, the generators and the additional components are functionally supported on crosswise supports that span the separation distance. The generator and the possible additional components and also the gear can then be removed to the bottom between the two supports extending in the direction of the rotor axis for the purposes of assembly or disassembly, whereby if necessary, the crosswise supports must be disconnected from the supports extending in the direction of the rotor axis beforehand. The supports extending in the direction of the rotor axis do not have to run exactly parallel to the direction of the rotor axis. In particular, they can converge in the direction toward the end that faces away from the rotor.

Figure 2:
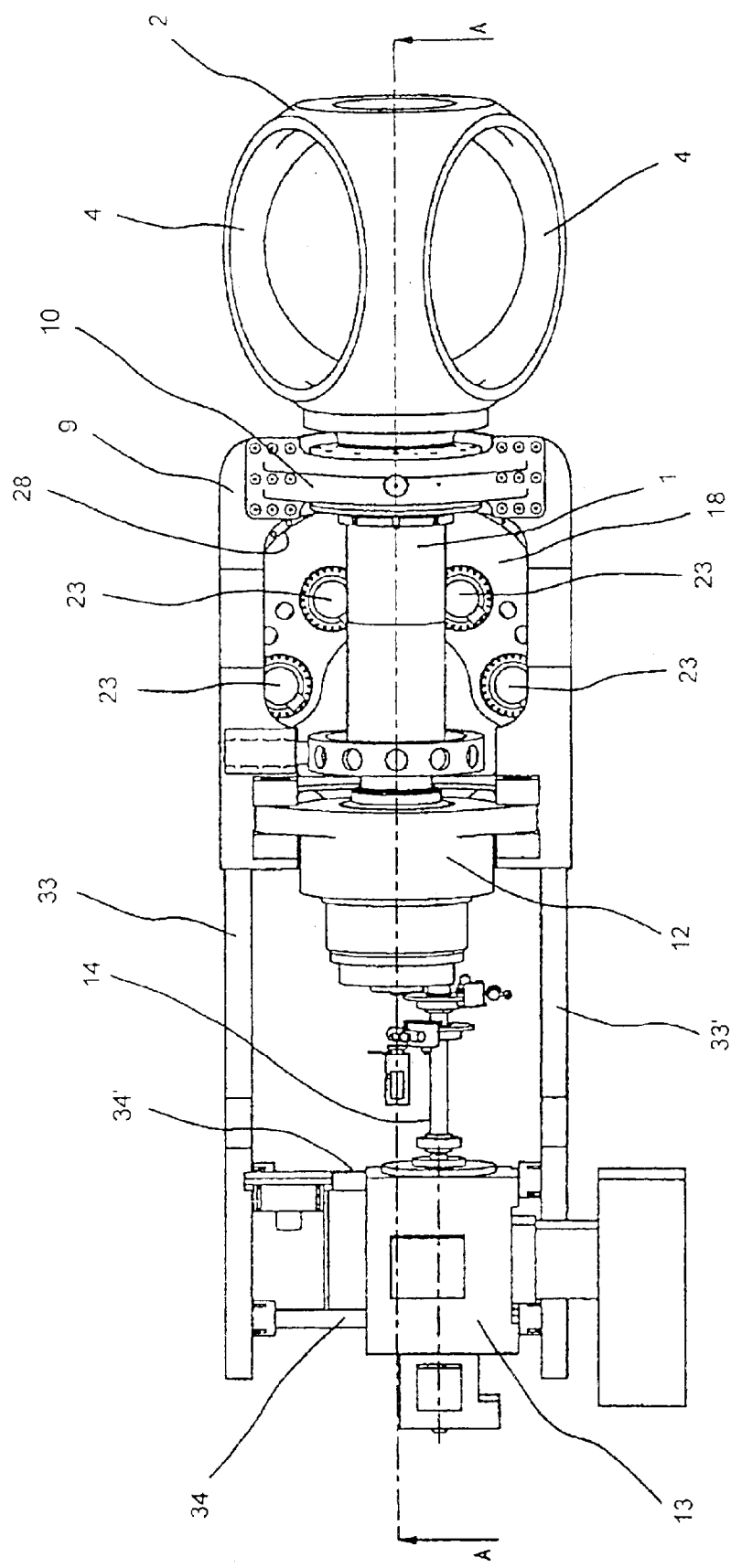
Figure 4:
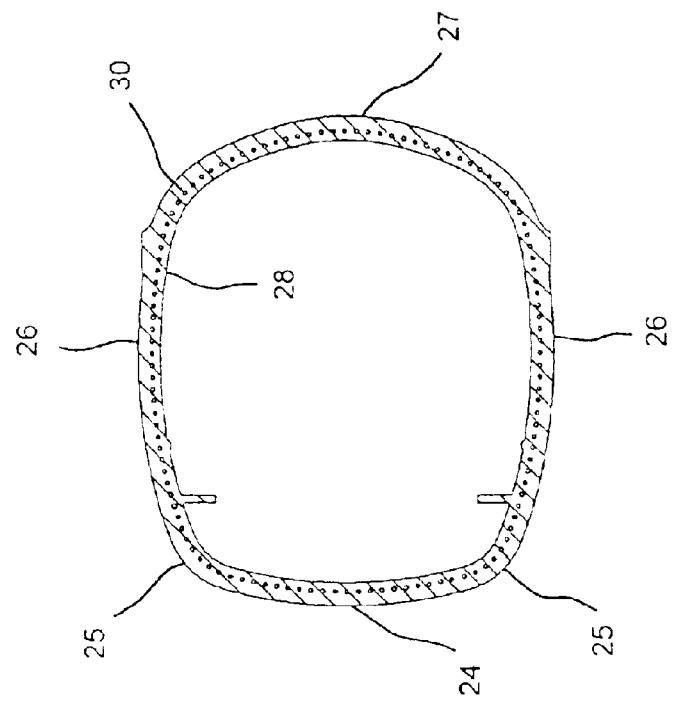
Figure 3:
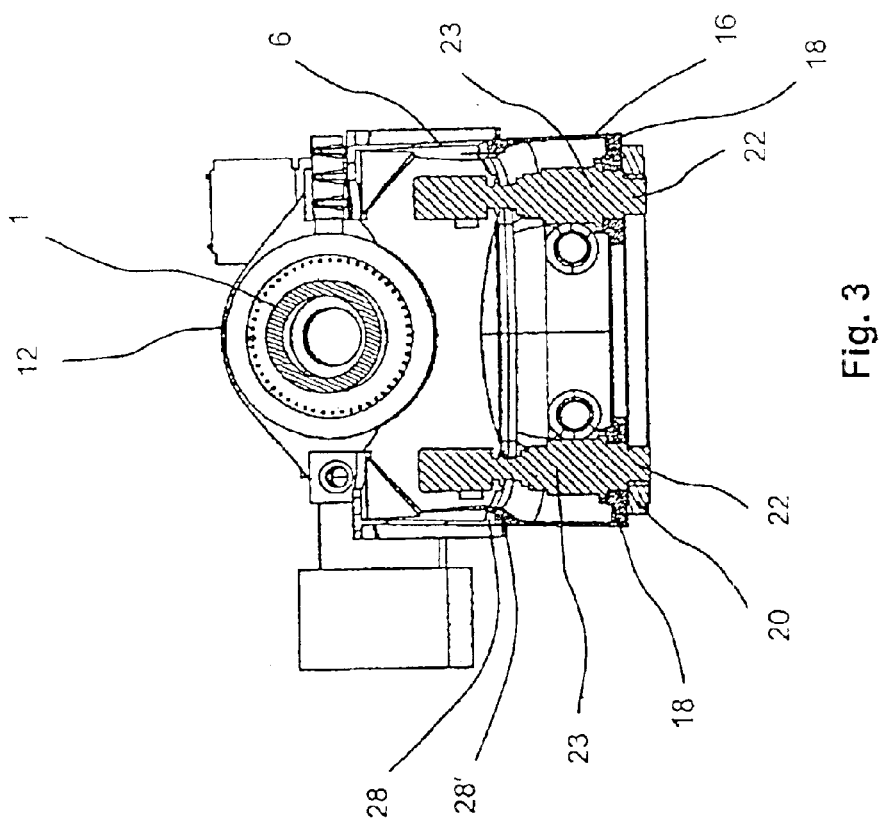

In the following description, the invention is explained in greater detail with reference to the drawing. Shown are:

FIG. 1 a longitudinal section of a base frame through the tower axis and the rotor axis of a wind power plant with the structural units mounted on it according to the line A—A in FIG. 2, FIG. 2 a view in the direction of the tower axis onto the base frame shown in FIG. 1, FIG. 3 a cross-section through the base frame according to the line C—C in FIG. 1, FIG. 4 a view of a connection point between a lower and an upper part of a hollow body of the base frame shown in FIG. 1 to 3.

In FIGS. 1 and 2, the shaft 1 and the hub 2 of the rotor of a wind power plant arranged on its one end can be recognized, whereby the rotor axis 3 around which the rotor turns is also shown. The hub 2 has, in the embodiment example shown, a total of three radial recess openings 4, which are azimuthally set off at equal distances relative to the rotor axis 3, for the ends of three rotor blades (not shown), the longitudinal axes of which extend radially to the rotor axis 3 and which can be turned in the recess openings 4 around their longitudinal axes in order to adjust their angle of attack. The shaft 1 is set in bearings near the hub 2 via a main bearing 5, which is affixed in a recess 7 of a hollow body 8 constructed in an upper part 6. In connection with FIG. 2, it is clear that the upper part 6 in the area of the receptacle 7 has an open edge 9, which lies in a hypothetical plane going through the rotor axis 3, which extends perpendicularly to the plane of the drawing of FIG. 1 and parallel to the plane of the drawing of FIG. 2. From this open edge 9, the receptacle 7 is hollowed out of the upper part 6 of the hollow body 8 in the shape of a semicircle in relation to the rotor axis 3. A semicircle-shaped bearing holder 10 that is complementary to the receptacle extends above it, and the holder 10 is clamped by bolts onto the open edge 9.

In the area of the upper part 6 which faces away from the rotor, a receptacle 11 is constructed, which functions to hold a gear 12 connected to the end of the shaft 1 which is opposite the hub 2. In the gear 12, the relatively low input side rotational speed of the shaft 1 is raised in order to drive an electric generator 13, which is coupled to the output of the gear 12 by a coupling 14. The upper open edge 9 of the upper part 6 also runs in this area approximately in the hypothetical plane extending through the rotor axis 3 and perpendicularly to the plane of the drawing of FIG. 1, and/or parallel to the plane of the drawing of FIG. 2, so that the approximately cylindrical body of the gear 12 lies halfway within the receptacle 11 as seen radially.

From out of its upper open edge 9, the upper part 6 of the hollow body 8 extends essentially crosswise to the rotor axis 3 up to a connection point 15 with a lower part 16 of the hollow body 8. The lower end area 17 of the lower part 16 opposite the connection point 15 functions for the connection to the upper end of the tower (not shown) of the wind power plant. For this purpose, the lower end area 17 has a flange 18 that is directed to the inside and radially in relation to the tower axis, which can be seen especially clearly in FIG. 3. On the outer end face of the radial flange 18 pointing to the upper end of the tower, the outer ring 19 of a large roller bearing 20 (shown only schematically in the drawing) is affixed, the inner ring 21 of which is provided with inner teeth. With these inner teeth, drive pinions 22 of a total of four servomotors mesh, which are arranged inside the hollow body 8 and are flanged mounted on the radial flange 18 in an orientation, parallel to the tower axis, of their drive shaft that drives the drive pinion 22. The four servomotors 23 are arranged on the radial flange 18 in pairs symmetrically to a hypothetical plane positioned through the tower axis and the rotor axis 3. The inner ring 21 is affixed to the upper end of the tower (not shown). As a result, by an activation of the servomotor 23, the entire base frame is azimuthally moved in relation to the tower axis whereby the rotor axis 3 is oriented according to the wind flow. In FIG. 1 it can be seen that the rotor axis 3 does not run perpendicularly to the tower axis, but instead increases somewhat to the hub 2. In this way, an open space is created for a wind pressure-related deflection of the rotor blades relative to the tower.

In the lower end area 17 of the lower part 16 bordering the upper end of the tower, the cross-section of the hollow body 8, which is radial in relation to the tower axis, has a contour that is circle-shaped coaxially to the tower axis. For the radial cross-sections of the hollow body 8 that are positioned above it axially, the circle shape makes a smooth transition into contours that are symmetric to the rotor axis 3 and extended in its direction.

FIG. 4 shows the contour of the connection point 15, which lies in a plane, which extends parallel to the rotor axis 3 and perpendicularly to a plane that is positioned through the rotor axis 3 and the tower axis. The end area of this contour, which faces away from the rotor, has a slightly arched first section 24, which extends crosswise to the rotor axis 3 and is bent rounded off at its ends 25 approximately parallel to the rotor axis 3 in the direction to the end area faces towards the rotor. To the bent ends 25, side sections 26 that are only slightly convexly arched connect in the direction to the end area that faces towards the rotor. These side sections are connected to each other, at the end area that faces towards the rotor, through a second section 27 that is bent towards the first section 24.

It can be seen in FIGS. 1 and 4 that the upper and the lower part 6, 16 each have a flange 28 and/or 28' directed inside at the connection point 15. The end faces of this flange which face each other lie on each other and are clamped together by bolts 29 which are arranged in close series along the flanges 28, 28'. In the embodiment example shown, the flange 28 of the upper part 6 is provided with bore holes 30 going through for the passage of the bolts 29, whereas the flange 28' of the lower part 16 has threaded holes that are equivalent in coverage, in which the bolts 29 are screwed tight.

The contours of the longitudinal sections of the hollow body 8 parallel to the tower axis and the rotor axis 3 run, as can be seen in FIG. 1, in their areas that face away from the rotor, essentially parallel to the tower axis. Such a contour section that runs parallel is indicated in FIG. 1 with the reference indicator 31. In its area that faces towards the rotor, these contours run at a distance to the tower axis increasing from the bottom to the top. The contour section involved is indicated in FIG. 1 with the reference indicator 32.

FIGS. 1 and 2 show especially clearly two elongated supports 33, 33' of I-shaped cross-section, which are affixed on the end of the upper part 6 which faces away from the rotor and extend from there, in the embodiment example shown, approximately parallel to the rotor axis 3 and along a plane radial in relation to the tower axis. The distance between the two supports 33, 33' corresponds approximately to the cross-section measurement of the upper part 6. On these supports 33, 33', the generator 13 is supported via crosswise supports 34, 34' extending crosswise to their longitudinal direction. Furthermore, on the supports 33, 33' if necessary, additional components (not shown) of the wind power plant can be supported.

In the construction of a new wind power plant, usage is made of the structure of the base frame, in particular, in the following manner: Both the upper part 6 including the two supports 33, 33' and the lower part 16 are pre-assembled in the manufacturer's factory, completely or in part, with the components to be allocated to them, in particular, the shaft 1, the gear 2, the generator 13 and the azimuthal drive 20, 23. The two pre-assembled units are transported to the construction site. There, the lower part 16 is lifted onto the tower and connected to its upper end. Then, the upper part 6 is set onto the lower part 16 and screwed down at the connection point 15 with the lower part 16.

| Index of Reference Numbers | |
|---|---|
| 1 | Shaft |
| 2 | Hub |
| 3 | Rotor axis |
| 4 | Receptacle opening |
| 5 | Main bearing |
| 6 | Upper part |
| 7 | Receptacle |
| 8 | Hollow body |
| 9 | Open edge |
| 10 | Bearing block |
| 11 | Receptacle |
| 12 | Gear |
| 13 | Generator |
| 14 | Coupling |
| 15 | Connection point |
| 16 | Lower part |
| 17 | Lower end area |
| 18 | Radial flange |
| 19 | Outer ring |
| 20 | Roller bearing |
| 21 | Inner ring |
| 22 | Drive pinion |
| 23 | Servomotor |
| 24 | First section |
| 25 | End |
| 26 | Side sections |
| 27 | Second section |
| 28, 28' | Flange |
| 29 | Screwed bolts |
| 30 | Holes |
| 31 | Contour section |
| 32 | Contour section |
| 33, 33' | Support |
| 34, 34' | Transverse support |

What is claimed is:

1. An apparatus, comprising:

A base frame for the arrangement of a drive train, which is driven by a wind-driven rotor of a wind power plant, on the tower of the wind power plant on which the base frame is affixed with an essentially horizontal orientation of the rotor axis so that it can rotate azimuthally around the essentially vertical axis of the tower and is constructed from a discrete upper part that carries the drive train and a discrete lower part that has an azimuthal drive device that is attachably joined with the upper part at a connection point, wherein the lower part provides for azimuthal rotation around the essentially vertical axis of the tower, wherein the connection point extends along an essentially horizontal cross-section that has a larger dimension in the direction of the rotor axis than in the direction perpendicular to that.

2. The apparatus according to claim 1, wherein the base frame has a hollow body that is radially limited in relation to the tower axis by an essentially closed wall, whereby the cross-sections of this hollow body have, in its lower end area that borders on the upper end of the tower, a circular contour that, for the cross-sections placed above it axially, makes a transition into a contour that is elongated in the direction of the rotor axis, and the connection point is arranged in the area of its elongated contours.

3. The apparatus according to claim 1, wherein the connection point of both the upper part and the lower part extends in a plane extending parallel to the rotor axis and perpendicularly to the tower axis.

4. The apparatus according to one of the claims 1, 2 or 3, wherein each of the upper part and the lower parts has a flange that is essentially radial in relation to the tower axis in the area of the connection point, and the end faces of the flange which face each other can be clamped together.

5. The apparatus according to claim 4, wherein the upper part and the lower parts can be connected by screwed bolts that pass through the flanges.

6. The apparatus according to one of the claims 3 or 5, wherein one or more elongated contours in the area of the connection point are constructed so that they are symmetrical to the rotor axis and have, at their end area that faces away from the rotor, a first section that extends crosswise to the rotor axis and is bent at its ends in the direction to the end area that faces the rotor, a second section that is located at its end area that faces the rotor and is bent towards the end area that faces away, and two side sections that connect the first section to the second section.

7. The apparatus according to claim 6, wherein the contours of the longitudinal sections of the hollow body parallel to the tower axis and to the rotor axis run essentially parallel to the tower axis in their area that faces away from the rotor and in their area that faces towards the rotor, they run at a distance from the tower axis which increases from the bottom to the top.

8. The apparatus according to one of the claims 1, 2 or 3, wherein a recess for a rotor shaft bearing is constructed in the upper part in its area that faces the rotor.

9. The apparatus according to one of the claims 1, 2 or 3, wherein a recess for the support of a gear is constructed in the upper part in its area that faces away from the rotor.

10. The apparatus according to one of the claims 2 or 3, wherein the lower part has, on its lower end area that borders the upper end of the tower, a flange directed radially to the inside, on which at least one servomotor of the azimuthal drive device is arranged with the drive axis parallel to the tower axis and a pinion gear that is arranged rotationally fixed on the drive axis for combing mesh into an inner crown gear that is affixed on the upper end of the tower coaxially to the tower axis.

11. The apparatus according to claim 10, wherein the inner crown gear is constructed on the inner ring of a roller bearing whose outer ring is affixed to the lower part.

12. The apparatus according to one of the claims 1, 2 or 3, wherein, on the upper part, two supports that extend away from its end that faces away from the rotor essentially in the direction of the rotor axis are arranged, on which at least one generator of the wind power plant can be supported.

13. An apparatus, comprising: A base frame for the arrangement of a drive train, which is driven by a wind-driven rotor of a wind power plant, on the tower of the wind power plant on which the base frame is affixed with an essentially horizontal orientation of the rotor axis so that it can rotate azimuthally around the essentially vertical axis of the tower and is constructed from a discrete upper part that carries the drive train and a discrete lower part that has an azimuthal drive device that is attachably joined with the upper part at a connection point, wherein the lower part provides for azimuthal rotation around the essentially vertical axis of the tower, wherein the connection point extends along an essentially horizontal cross-section that has a larger dimension in the direction of the rotor axis than in the direction perpendicular to that, wherein the base frame has a hollow body that is radially limited in relation to the tower axis by an essentially closed wall, whereby the cross-sections of this hollow body have, in its lower end area that borders on the upper end of the tower, a circular contour that, for the cross-sections placed above it axially, makes a transition into a contour that is elongated in the direction of the rotor axis, and the connection point is arranged in the area of its elongated contours, wherein the elongated contours in the area of the connection point are constructed so that they are symmetrical to the rotor axis and have, at their end area that faces away from the rotor, a first section that extends crosswise to the rotor axis and is bent at its ends in the direction to the end area that faces the rotor, a second section that is located at its end area that faces the rotor and is bent towards the end area that faces away, and two side sections that connect the first section to the second section.

14. The apparatus according to claim 13, wherein the contours of the longitudinal sections of the hollow body parallel to the tower axis and to the rotor axis run essentially parallel to the tower axis in their area that faces away from the rotor and in their area that faces towards the rotor, they run at a distance from the tower axis which increases from the bottom to the top.

15. A base frame for the arrangement of a drive train, which is driven by a wind-driven rotor of a wind power plant, on the tower of the wind power plant on which the base frame is affixed with an essentially horizontal orientation of the rotor axis so that it can rotate azimuthally around the essentially vertical axis of the tower and is constructed from a discrete upper part that carries the drive train and a discrete lower part that has an azimuthal drive device that is attachably joined with the upper part at a connection point, wherein the lower part provides for azimuthal rotation around the essentially vertical axis of the tower, wherein the connection point extends along an essentially horizontal cross-section that has a larger dimension in the direction of the rotor axis than in the direction perpendicular to that, wherein the lower part has, on its lower end area that borders the upper end of the tower, a flange directed radially to the inside, on which at least one servomotor of the azimuthal drive device is arranged with the drive axis parallel to the tower axis and a pinion gear that is arranged rotationally fixed on the drive axis for combing mesh into an inner crown gear that is affixed on the upper end of the tower coaxially to the tower axis.

16. The apparatus according to claim 15, wherein the base frame has a hollow body that is radially limited in relation to the tower axis by an essentially closed wall, whereby the cross-sections of this hollow body have, in its lower end area that borders on the upper end of the tower, a circular contour that, for the cross-sections placed above it axially, makes a transition into a contour that is elongated in the direction of the rotor axis, and the connection point is arranged in the area of its elongated contours.

17. The apparatus according to claim 15, wherein the connection point of both the upper part and the lower part extends in a plane extending parallel to the rotor axis and perpendiculariy to the tower axis.

18. The apparatus according to claim 15, wherein the inner crown gear is constructed on the inner ring of a roller bearing whose outer ring is affixed to the lower part.

* * * * *

US006879055C1

(12) INTER PARTES REEXAMINATION CERTIFICATE (730th)

United States Patent
Becker et al.

(10) Number: US 6,879,055 C1
(45) Certificate Issued: Nov. 5, 2013

(54) BASE FRAME FOR MOUNTING THE SHAFT OF THE ROTOR OF A WIND POWER PLANT ONTO THE PLANT TOWER

(75) Inventors: Markus Becker, Rheine (DE); Roland Weitkamp, Belm-Icker (DE); Vincent Schellings, Enschede (NL)

(73) Assignee: General Electric Company, Schenectady, NY (US)

Reexamination Request:
No. 95/001,593, Apr. 1, 2011

Reexamination Certificate for:
Patent No.: 6,879,055
Issued: Apr. 12, 2005
Appl. No.: 10/126,299
Filed: Apr. 19, 2002

(30) Foreign Application Priority Data

Apr. 20, 2001 (DE) .................................. 101 19 428

(51) Int. Cl.
*F03D 9/00* (2006.01)
*F03D 1/06* (2006.01)
*F03D 11/00* (2006.01)
*F03D 11/04* (2006.01)
*F03D 7/02* (2006.01)

(52) U.S. Cl.
USPC .................................. 290/55; 290/44; 290/54

(58) Field of Classification Search
USPC ............................................................ 290/55
See application file for complete search history.

(56) References Cited

To view the complete listing of prior art documents cited during the proceeding for Reexamination Control Number 95/001,593, please refer to the USPTO's public Patent Application Information Retrieval (PAIR) system under the Display References tab.

*Primary Examiner* — Robert M. Fetsuga

(57) ABSTRACT

To facilitate transport and assembly during the erecting of wind power plants, a two-part base frame is proposed for the azimuthal adjustment of the gondola on the tower of the wind power plant, the lower part of which 16 has the azimuthal drive device 23 and the upper part 6 of which has the drive train 1, 2, 12, 13, 14. Both parts are pre-assembled at the factory, set onto the tower, and screwed tight onto each other at their connection point 15.

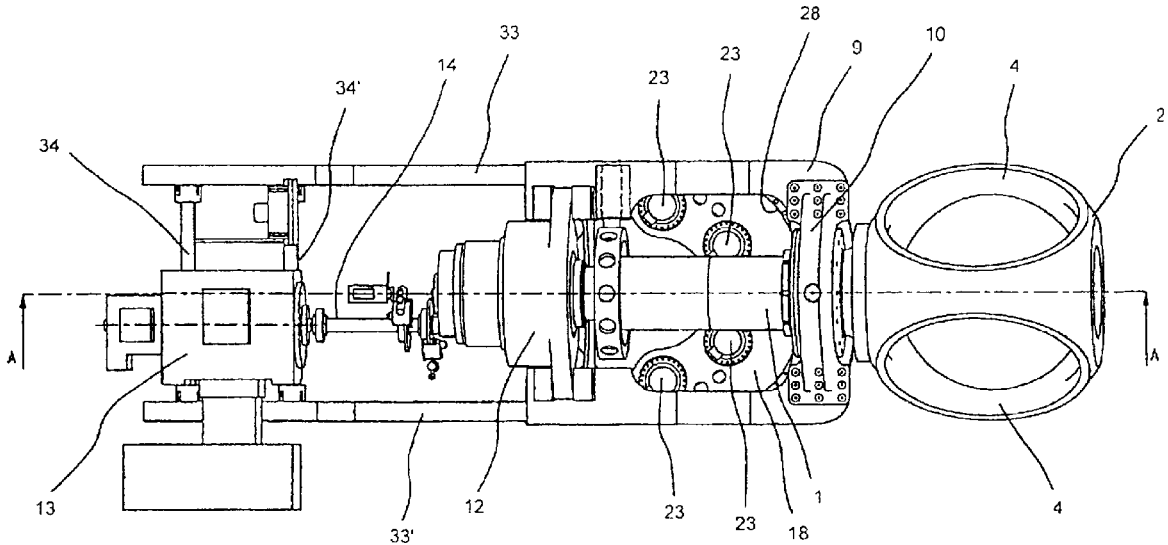

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-18 are cancelled.

\* \* \* \* \*